United States Patent
Kochiev et al.

(10) Patent No.: US 12,550,002 B2
(45) Date of Patent: Feb. 10, 2026

(54) SYSTEM AND METHOD FOR CARRIER LOAD BALANCING IN WIRELESS COMMUNICATIONS

(71) Applicant: T-MOBILE INNOVATIONS LLC, Overland Park, KS (US)

(72) Inventors: Timur Kochiev, Irvine, CA (US); Mochamad Mirza, Bothell, WA (US); Relin Thomas, Bothell, WA (US)

(73) Assignee: T-Mobile Innovations LLC, Overland Park, KS (US)

(*) Notice: Subject to any disclaimer, the term of this patent is extended or adjusted under 35 U.S.C. 154(b) by 358 days.

(21) Appl. No.: 18/132,730

(22) Filed: Apr. 10, 2023

(65) Prior Publication Data
US 2024/0340699 A1   Oct. 10, 2024

(51) Int. Cl.
*H04W 28/08* (2023.01)
*H04L 5/00* (2006.01)
*H04W 28/082* (2023.01)

(52) U.S. Cl.
CPC ............ *H04W 28/082* (2023.05); *H04L 5/001* (2013.01)

(58) Field of Classification Search
CPC ............ H04W 28/08; H04W 28/0812; H04W 28/082; H04W 36/22; H04W 72/12; H04L 5/001; H04L 5/0098
See application file for complete search history.

(56) References Cited

U.S. PATENT DOCUMENTS

| | | | |
|---|---|---|---|
| 9,253,729 B1 * | 2/2016 | Sundar | H04W 52/028 |
| 9,258,068 B2 * | 2/2016 | Wang | H04B 17/382 |
| 9,258,069 B2 * | 2/2016 | Sesia | H04W 24/08 |
| 9,392,477 B2 * | 7/2016 | Gormley | H04W 24/08 |
| 9,774,426 B2 * | 9/2017 | Seo | H04L 1/0027 |
| 9,807,634 B2 * | 10/2017 | Jeong | H04W 24/10 |
| 10,314,055 B1 * | 6/2019 | Marupaduga | H04L 5/0069 |
| 10,674,498 B2 * | 6/2020 | Chakraborty | H04W 76/15 |
| 11,589,354 B1 * | 2/2023 | Pawar | H04W 72/51 |
| 12,028,763 B1 * | 7/2024 | Polaganga | H04W 72/0453 |
| 2022/0200751 A1 * | 6/2022 | He | H04L 5/0048 |

* cited by examiner

*Primary Examiner* — Alpus Hsu
(74) *Attorney, Agent, or Firm* — Shook, Hardy and Bacon L.L.P.; Elena K. McFarland (57) ABSTRACT

Aspects herein provide a system and method for intelligently addressing the technological problems created by bursty traffic. In aspects, throughput estimations across various carriers are determined and utilized to perform beneficial handovers of user devices that improve service.

20 Claims, 4 Drawing Sheets

SYSTEM AND METHOD FOR CARRIER LOAD BALANCING IN WIRELESS COMMUNICATIONS

TECHNICAL BACKGROUND

The present disclosure generally relates to carrier aggregation techniques in the context of telecommunications.

SUMMARY

A high-level overview of various aspects of the invention are provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media that determine when to disconnect a user device from a current carrier and cause the user device to connect to another carrier in order to balance carrier loading, which improves throughput of the user device.

BRIEF DESCRIPTION OF THE DRAWINGS

Aspects are described in detail below with reference to the attached drawings figures, wherein.

DETAILED DESCRIPTION

The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the aspects set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| 3G | Third-Generation Wireless Access Technology |
| 4G | Fourth-Generation Wireless Access Technology |
| 5G | Fifth-Generation Wireless Access Technology |
| 5GC | Fifth-Generation Wireless Access Technology Core Network |
| AAU | Active Antenna Unit |
| BRS | Broadband Radio Service |
| CD-ROM | Compact Disk Read Only Memory |
| CDMA | Code Division Multiple Access |
| CU | Central unit |
| DU | Distribution unit |
| EIRP | Equivalent Isotropically Radiated Power |
| eNodeB | Evolved Node B |
| EVDO | Evolution-Data Optimized |
| GIS | Geographic/Geographical/Geospatial Information System |
| gNB | Next Generation Node B |
| gNB CU | Next Generation Node B Central Unit |
| gNB DU | Next Generation Node B Distribution Unit |
| GPRS | General Packet Radio Service |
| GSM | Global System for Mobile Communications |
| iDEN | Integrated Digital Enhanced Network |
| DVD | Digital Versatile Disc |
| EEPROM | Electrically Erasable Programmable Read-Only Memory |
| FD-MIMO | Full Dimension Multiple-Input Multiple-Output |
| IOT | Internet of Things |
| IIOT | Industry Internet of Things |
| LED | Light Emitting Diode |
| LTE | Long Term Evolution |
| MEC | Mobile Far Edge Computer |
| MD | Mobile Device |
| MIMO | Multiple-Input Multiple-Output |
| mMIMO | Massive Multiple-Input Multiple-Output |
| MMU | Massive Multiple-Input Multiple-Output Unit |
| mmWave | Millimeter Wave |
| NEXRAD | Next-Generation Radar |
| NR | New Radio |
| OOBE | Out-of-Band-Emission |
| OTN | Optical Transport Network |
| PC | Personal Computer |
| PCS | Personal Communications Service |
| PDA | Personal Digital Assistant |
| PLMN | Public Land Mobile Network |
| PRB | Physical Resource Block |
| vPRB | Virtualized Physical Resource Block |
| RAN | Radio Access Network |
| RAM | Random Access Memory |
| RET | Remote Electrical Tilt |
| RF | Radio-Frequency |
| RFI | Radio-Frequency Interference |
| RIC | Radio Intelligent Controller |
| RLF | Radio Link Failure |
| R/N | Relay Node |
| RNR | Reverse Noise Rise |
| ROM | Read-Only Memory |
| RRU | Remote Radio Unit |
| RSRP | Reference Signal Receive Power |
| RSRQ | Reference Signal Receive Quality |
| RSSI | Received Signal Strength Indicator |
| RU | Radio Unit |
| SINR | Signal-to-Interference-Plus-Noise Ratio |
| SNR | Signal-to-Noise Ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications System |
| UTRAN | UMTS Radio Access Network |
| E-UTRAN | Evolved Universal Mobile Telecommunications System |
| WCD | Wireless Communication Device (interchangeable with UE) |
| WLAN | Wireless Local Area Network |
| XR | Extended Reality |

Further, various technical terms are used throughout this description. An illustrative resource that fleshes out various aspects of these terms can be found in Newton's Telecom Dictionary, 25th Edition (2009).

Aspects herein may be embodied as, among other things: a method, system, or set of instructions embodied on one or more computer-readable media. Computer-readable media include both volatile and non-volatile media, removable and non-removable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVDs), holographic media or other optical disc storage, magnetic cassettes, magnetic tape, magnetic disk storage, and other magnetic storage devices. These technologies can store data momentarily, temporarily, or permanently. Aspects may take the form of a hardware embodiment, or an embodiment combining software and hardware. Some aspects may take the form of a computer program product that includes computer-useable or computer-executable instructions embodied on one or more computer-readable media.

"Computer-readable media" can be any available media and may include volatile and non-volatile media, as well as removable and non-removable media. By way of example, and not limitation, computer-readable media may include computer storage media and communication media.

"Computer storage media" may include, without limitation, volatile and non-volatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, DVDs, or other optical disk storage, magnetic cassettes, magnetic tape, magnetic disk storage, or other magnetic storage device, or any other medium that can be used to store the desired information and which may be accessed by the computing device 400 shown in FIG. 4.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner so as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage to one or more user devices. For example, the network may include one or more, or a plurality of, wireless networks, hardwired networks, telecommunication networks, peer-to-peer networks, distributed networks, and/or any combination thereof. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various aspects. Examples of a network include a telecommunications network (e.g., 3G, 4G, 5G, CDMA, CDMA 1xA, GPRS, EVDO, TDMA, GSM, LTE, and/or LTE Advanced). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad hoc (mesh) network. The network may include or may communicate with a physical location component for determining a geographic location of an item, package, parcel, personnel, vehicle, endpoint location, etc., by leveraging, for example, a Global Positioning System (GPS), Global'naya Navigatsionnaya Sputnikovaya Sistema (GLONASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity, or "SOP").

"Physical resource block" (PRB) and "actual physical resource block" are used interchangeably to refer to a defined quantity of consecutive subcarriers in a frequency domain that are used for wireless transmission and wireless reception of waveform signals via antenna/antenna elements. In some instances, a physical resource block has a defined quantity of consecutive subcarriers in a frequency domain within one slot in a time domain (e.g., LTE). In other instances, a physical resource block has a defined quantity of consecutive subcarriers in a frequency domain independent of the time domain (e.g., 5G NR). In one example, one resource block has twelve consecutive subcarriers of a frequency domain, where one subcarrier corresponds to one resource element in the resource block. The bandwidth of various physical resource blocks is dependent on the numerology and subcarrier spacing utilized, which corresponds to the frequency bands as defined in kilohertz (kHz) and which determines the cyclic prefix of said block in milliseconds (ms). For example, 5G NR technology supports subcarrier spacing of 15, 30, 60, 120 and 240 kHz while LTE technology supports only one subcarrier spacing of 15 kHz. The physical resource blocks form bandwidth parts (BWP). The physical resource blocks discussed herein are compatible and usable in LTE, LTE-M, 3G, 4G, 5G, IoT, IIoT, NB-IOT, and similar technologies without limitation. For this reason, physical resource blocks are discussed herein in a network agnostic manner as the aspects discussed herein can be implemented within each of the different technology environments.

"Cell site" is used herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

"Access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter. Access point refers to a device with complex software that is specifically configured to provide one or more user devices with a connection and/or access to a wireless network using, for example, an antenna, an antenna array, and/or one or more antenna elements. Examples of an access point include a cell tower, a cell site, a base station, a NodeB, an eNodeB, a gNodeB, a macro cell, a micro cell, a femtocell, a picocell, and/or a computing device capable of acting as a wireless "hotspot." The terms "access point," "cell site," "base station," and "cell tower" are used interchangeably for simplicity, and thus the terms should not be construed as limiting with regard to one another unless expressly designated as such in this Detailed Description. Examples of a cell site include macro cells such as a cell tower controlled by a gNodeB, as well as small cells, such as a femto cell or pico cell. Accordingly, the scale and coverage area of an access point is not limited to the examples discussed, and any size and shape of coverage area are contemplated to be within the scope of the invention. Because a cell tower and a base station(s) controlling the cell tower may be remote from one another, or alternatively may be localized to each other, the term access point is not intended to be so limited as to require a cell tower and/or antenna. Generally, an access point, as discussed herein, is intended to refer to any device, whether local or remote to a physical location of a cell tower and/or antenna, having complex software that is specifically configured to provide one or more user devices with a connection and/or access to a wireless network.

"User equipment," "UE," "mobile device," "user device," and "wireless communication device" are used interchangeably to refer to a device employed by an end-user that communicates using a network. User devices generally includes one or more antenna coupled to a radio for exchanging (e.g., transmitting and receiving) transmissions with a nearby base station, via an antenna array of the base station. In aspects, user devices may take on any variety of devices, such as a personal computer, a laptop computer, a tablet, a netbook, a mobile phone, a smartphone, a personal digital assistant, a wearable device, a fitness tracker, or any other device capable of communicating using one or more resources of the network. User devices may include components such as software and hardware, a processor, a memory, a display component, a power supply or power source, a speaker, a touch-input component, a keyboard, and the like. In aspects, some of the user devices discussed herein may include current user devices capable of using 5G and having backward compatibility with prior access technologies, current use devices capable of using 5G and lacking backward compatibility with prior access technologies, and/or legacy user devices that are not capable of using 5G.

The terms "radio," "controller," "antenna," and "antenna array" are used interchangeably to refer to one or more software and hardware components that facilitate sending and receiving wireless radio frequency (RF) signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

As used in the context of carrier aggregation, the term "carrier component" is generally used to refer to pre-designated or pre-assigned bandwidths and/or timing slots that are used for wireless signaling, for example, in the context of Frequency Division Duplexing (FDD), Time Division Duplexing (TDD), and Orthogonal Frequency Division Modulation (OFTM). In carrier aggregation, bandwidth and data rates can be optimized or improved by aggregating a plurality of component carriers (CC), using concatenation, so that user device can simultaneously receive and/or transmit information using the multiple aggregated carriers. For example, in 5G NR technology can support aggregation of up to approximately 16 component carriers, and up to 1 Gigahertz (GHz). Various types of carrier aggregation include intra-band contiguous types, inter-band non-contiguous types, and inter-band non-contiguous types. In aspects, a primary carrier component (PCC) generally facilitates control signaling and a secondary carrier component (SCC) generally facilitates other signaling to increase data throughput.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Aspects herein provide a system, method, and media for handling load imbalance between primary and secondary carriers, and/or between various secondary carriers, with a carrier aggregation schema. For example, an unused or available secondary carrier may have a low or minimal data volume relative to a current primary carrier or a currently-used secondary carrier when there is "bursty traffic," meaning there are frequent small data packets resulting in increased and sudden traffic volumes, which further increases usage of resources (e.g., bandwidth). Bursty traffic may arise in the context of buffer-based application usage, such as video streaming. Aspects herein estimate throughput for a current carrier and one or more other carriers and determine whether to switch the user device from the current carrier to one of the other carriers, which rebalances carrier loading and addresses the technological problems that arise from bursty traffic.

Figure 1:
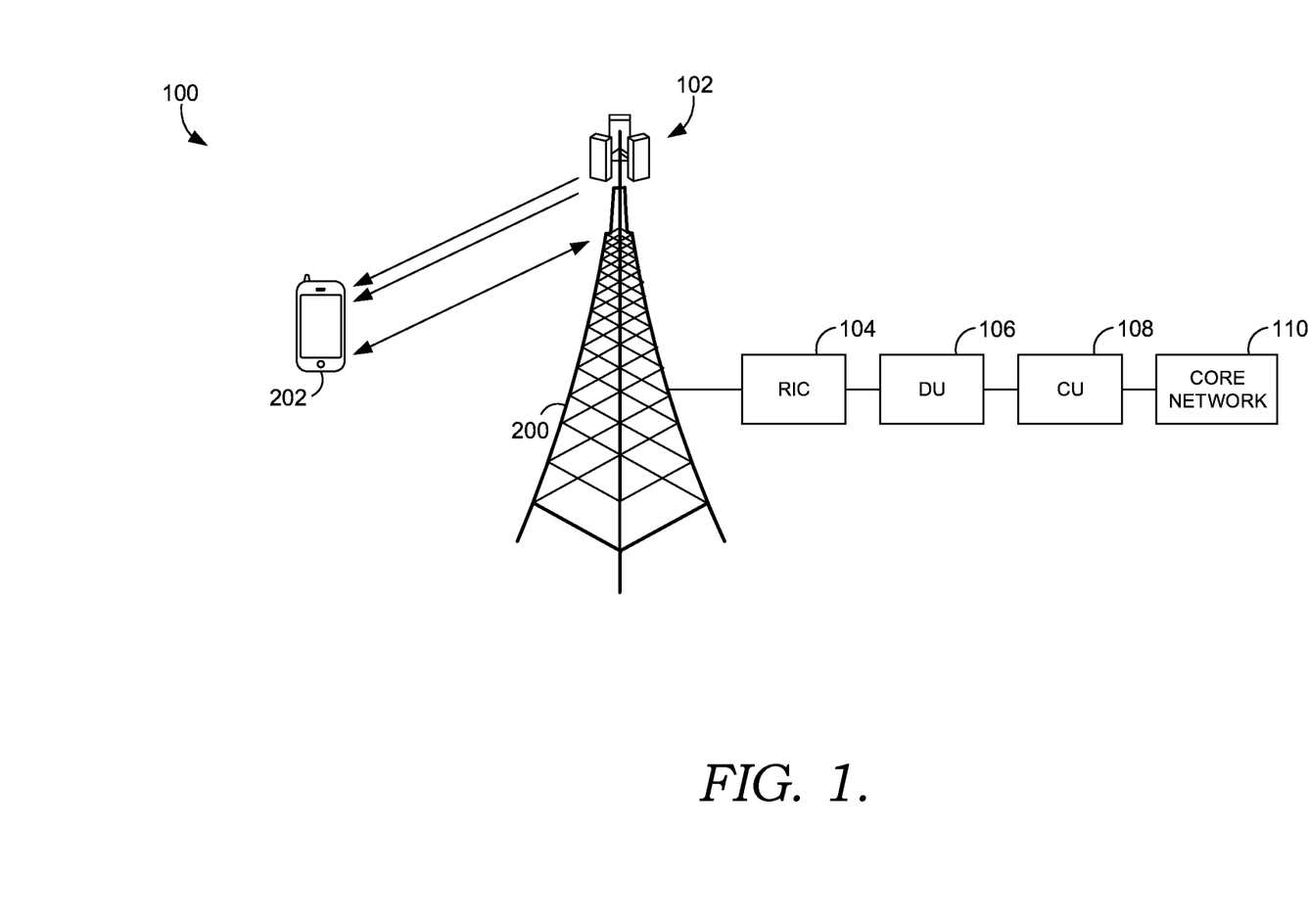
FIG. 1 depicts an example of a system in accordance with one or more aspects.

FIG. 1 provides a system 100. The system 100 includes a base station having radio unit 102, a radio intelligence controller 104, a distribution unit 106 (also interchangeably referred to as the "distributed unit"), a central unit 108 (also interchangeably referred to as the "centralized" unit), and a telecommunications core network 110 that interface with and connects the system 100 and its components to the internet.

The radio unit 102 includes software and hardware that convert radio signals received via an antenna into digital signals, which are then communicated to the distribution unit 106. The radio unit 102 can include, for example, one or more radio elements of an antenna or antenna array for transmission and receipt of radio frequency signals, for example, where the antenna is associated with or corresponds to a cell tower or base station. The radio unit 102 can include, for example, converters, power amplifiers, power supplies, bandpass filters, and other components. In one aspect, the radio unit 102 includes Synchronization and Fronthaul Transport components, Lower Physical Layer Baseband Processing components, Digital Front End (DFE) components, and/or RF Front End (RF FE) components, for example, to operate and function with an open RAN (O-RAN).

The radio intelligence controller (RIC) 104 is a software component that is communicatively coupled to one or more of the radio units 102, the distribution unit 106, the central unit 108, or any combination thereof. The radio intelligence controller 104 controls near real-time and non-real-time operations in the system 100, such as network performance, configurations, life cycle, beam optimization and more, for example. Generally, the radio intelligence controller 104 can be associated with, host, and/or support the Physical Layer (PHYS) in the protocol stack or architecture.

The distribution unit 106 is associated with and/or supports a physical layer associated with a plurality of physical resource blocks, in aspects. Additionally, the distribution unit 106 can be associated with and/or support a Media Access Control (MAC) layer, a Radio Link Control (RLC) layer, and others. The distribution unit 106 is configured, in aspects herein, to individually and dynamically control the allocation and reallocation of each of a plurality of virtual physical resource blocks.

The central unit 108 provides and/or supports one or more layers in the protocol stack. The central unit 108 can be associated with and/or support a Packet Data Convergence Protocol (PDCP) layer, a Service Data Adaptation Protocol (SDAP) layer, a Radio Resource Control (RRC) layer, and others in the protocol stack or architecture, for example. In aspects, the system 100 utilizes one or more processors and the components discussed above to perform specific operations and functions as further discussed hereinafter.

Figure 2:
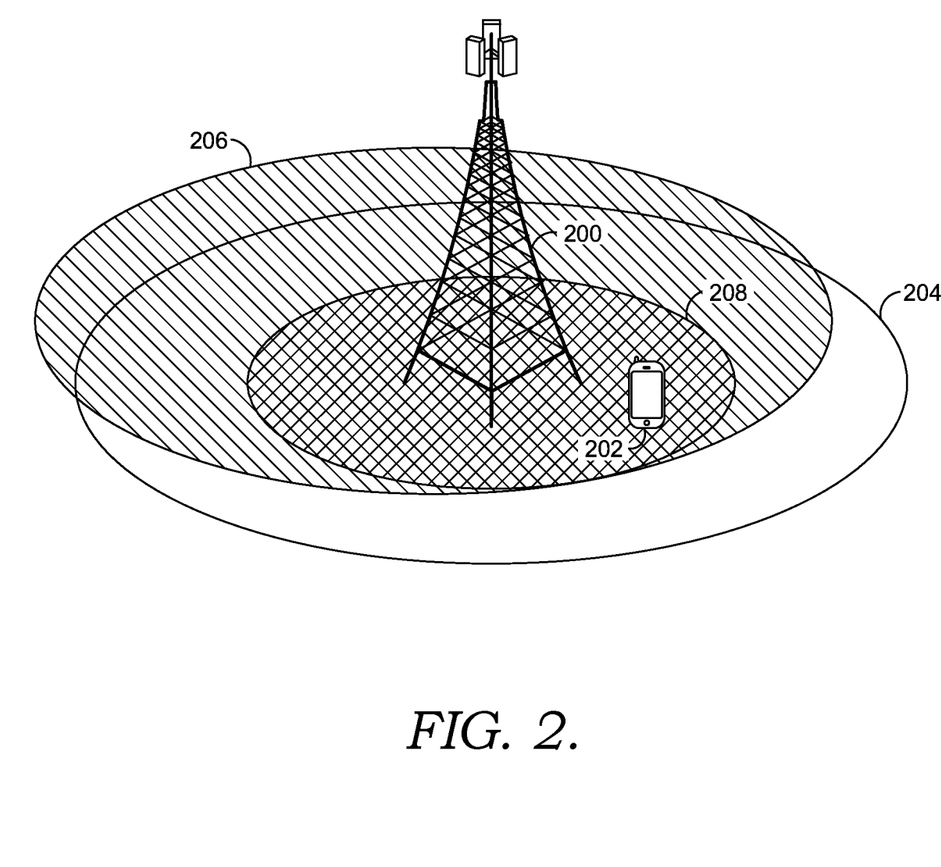
FIG. 2 depicts the system of FIG. 1 in accordance with one or more aspects.

Looking to FIG. 2, the base station 200 of the system 100 receives user device-specific data, wherein the user device-specific data identifies one or more of a user device-specific capability or user device-specific measurements of a particular user device 202. The base station 200 determines that the user device 202 is connected to a first carrier 204 and that a second carrier 206 is available for potential connection to the user device 202, as well as another secondary carrier 208. In some aspects, the first carrier 204 is a primary component carrier and the second carrier 206 is a secondary component carrier. In other aspects, the first carrier 204 is a secondary component carrier to which the user device 202 is connected and the second carrier 206 is another, distinct secondary component carrier that is available for potential connection to the user device 202.

Using the user device-specific data, the base station 200 determines a first estimated throughput of the user device 202 for the first carrier 204 to which the user device 202 is connected and a second estimated throughput of the user device 202 on the second carrier 206 that is available for potential connection to the user device 202 (i.e., the user device 202 is not currently using that carrier for signaling). When the first estimated throughput is less than the second estimated throughput and/or when the first estimated throughput is less than a throughput threshold, the base station 200 causes the user device 202 to disconnect from the first carrier 204 and to connect to the second carrier 206. When the first estimated throughput is equal to or greater than the second estimated throughput, the base station 200 causes the user device 202 to maintain connection to the first carrier 204. Through this technique for determining whether to move a user device 202 from one carrier to another in order to improve throughput and/or to meet or exceed a throughput threshold, the base station 200 balances carrier loading. These assessments and handover(s) between carriers can be performed for each of a plurality of user devices at a base station or for a subset of user devices selected or identified by a network or by a base station. These assessments and handover(s) between carriers can be performed intermittently, repeatedly, or periodically, using any reoccurring basis and/or in response to a triggering event.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIGS. 1 and 2. It will be appreciated by those of ordinary skill in the art that the location of components illustrated in FIGS. 1 and 2 are an example, as other methods, hardware, software, components, and devices for establishing communication links between the components shown in FIGS. 1 and 2, may be utilized in implementations of the present invention. It will be understood to those of ordinary skill in the art that the components may be connected in various manners, hardwired or wireless, and may use intermediary components that have been omitted or not included in FIGS. 1 and 2 for simplicity's sake. As such, the absence of components from FIGS. 1 and 2 should not be interpreted as limiting the present invention to exclude additional components and combination(s) of components. Moreover, though components are represented in FIGS. 1 and 2 as singular components, it will be appreciated that some aspects may include a plurality of devices and/or components such that FIGS. 1 and 2 should not be considered as limiting the number of a device or component.

Figure 3:
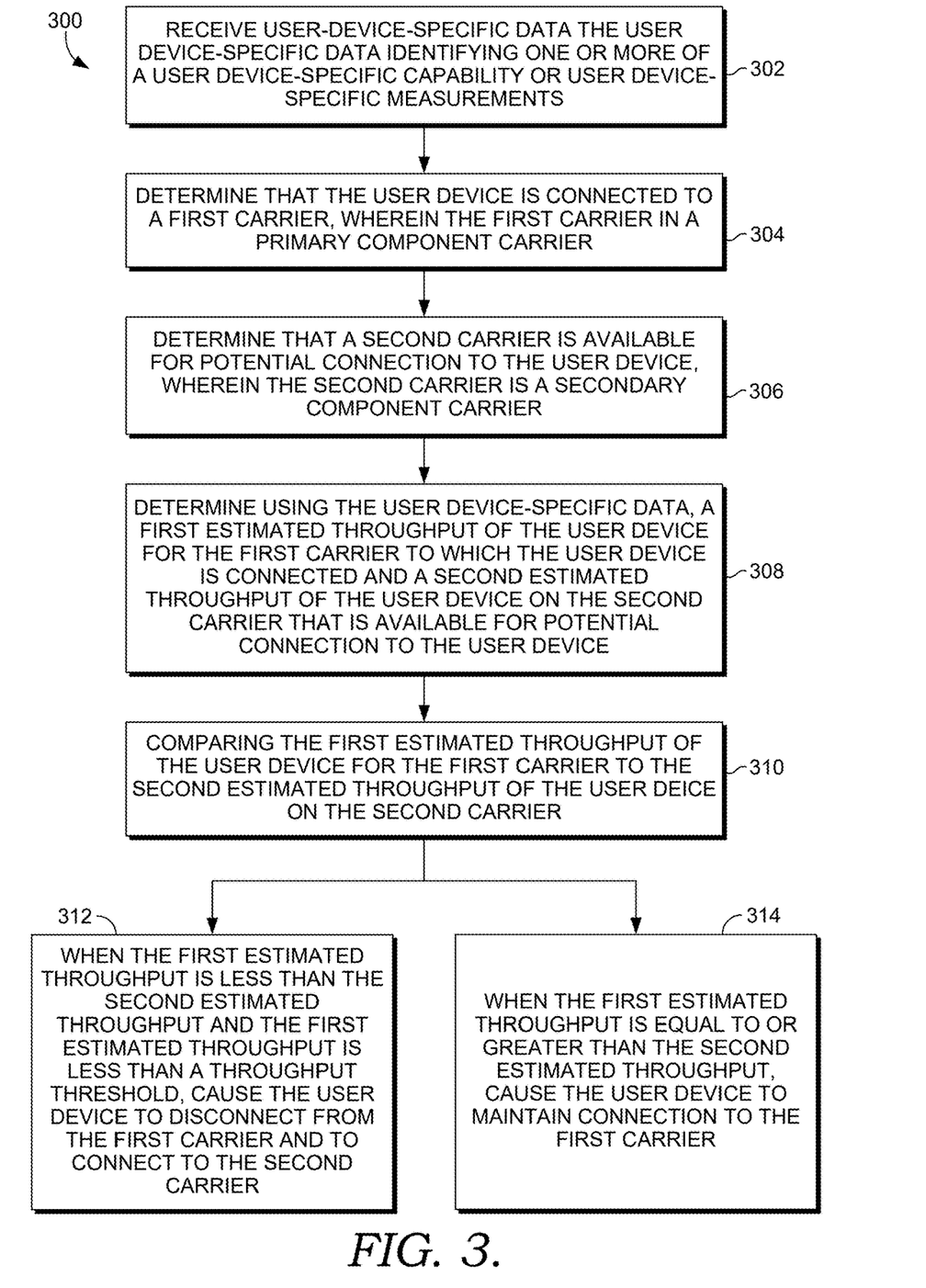
FIG. 3 provides a flowchart of an example method in accordance with one or more aspects.

Turning to FIG. 3, a method 300 is provided for carrier load balancing in a carrier aggregation schema. In some aspects, the method 300 can be a computer-implemented method. In one aspect, one or more non-transitory computer-readable storage media having computer-readable instructions or computer-readable program code portions embodied thereon, for execution via one or more processors, can be used to implement and/or perform the method 300. For example, computer-readable instructions or computer-readable program code portions can specify the performance of the method 300, can specify a sequence of steps of the method 300, and/or can identify particular component(s) of software and/or hardware for performing one or more of the steps of the method 300, in aspects. As discussed below, the method 300 can be performed using software, hardware, component(s), and/or device(s) depicted in the examples of FIGS. 1 and 2.

At block 302, user device-specific data is received, wherein the user device-specific data identifies one or more of a user device-specific capability or user device-specific measurements. In aspects, the user device-specific data can include device specifications, such as whether or not the user device is capable of operating using carrier aggregation, dual-connectivity, or other schema. Additionally or alternatively, the user device-specific data can include a unique identifier of the user device, a total bandwidth capacity of the user device (i.e., bandwidth that can be supported by the hardware, software, configurations, and/or components of the device), and radio frequency quality indicators of the user device. In some aspects, the base station may examine the radio frequency conditions, based on user device-specific data for each of a plurality of user devices, to identify a subset of one or more user devices for which the base station is or has observed load misbalancing between primary and secondary carriers. For example, the subset may include user devices that exhibit impaired or negatively impacted throughput, low Reference Signal Received Power (RSRP)/Reference Signal Received Quality (RSRQ) values, low Received Signal Strength Indicator (RSSI) values, and/or the like. The base station may further perform the subsequent steps particularly for the one or more user devices in the subset. In other aspects, the base station may perform the subsequent steps periodically for all user devices that are in range to manage, correct, and/or to prevent load imbalance between primary and secondary carriers.

At block 304, the base station determines that the user device is connected to a first carrier, wherein the first carrier is a primary component carrier. For example, the base station may receive or may reference a unique user device identifier and data indicating the user device is connected to the base station using the first carrier as its primary component carrier. At block 306, the base station determines that a second carrier is available for potential connection to the user device, wherein the second carrier is a secondary component carrier. For example, the base station may identify that the user device is in range of one or more other carriers (besides the first carrier) serviced by the base station, such that these one or more other carriers could potentially be used as one or more secondary component carriers.

At block 308, the base station determines, using the user device-specific data, a first estimated throughput of the user device for the first carrier to which the user device is connected and a second estimated throughput of the user device on the second carrier that is available for potential connection to the user device. In some aspects, the base station receives, obtains, and/or measures an RSRP value and an RSRQ value for the first carrier, as well as an RSRP value and an RSRQ value for the second carrier. Additionally or alternatively, the base station receives, obtains, and/or measures the total bandwidth that is supported by the first carrier, as well as the total bandwidth that is support by the second carrier. These examples of parameters may be used alone or in combination with other parameters, discussed below, in order for the base station to determine and to estimate throughput and/or other radio frequency conditions of the user device for the first carrier and the second carrier.

In various aspects, the estimated throughputs are determined by examining the loading per control channel. For example, the base station may determine loading per control channel element of the first carrier, determine loading per control channel element of the second carrier, and further, compare the loading per control channel element of the first carrier to the loading per control channel element of the second carrier. In various aspects, the estimated throughputs are determined by examining the loading per slot. For example, the base station may determine loading per slot of the first carrier, determine loading per slot of the second carrier, and compare the loading per slot of the first carrier to the loading per slot of the second carrier. In various aspects, the estimated throughputs are determined by examining loading per physical resource block. For example, the base station may determine loading per physical resource block for the first carrier, determine loading per physical resource block for the second carrier, and compare the loading per physical resource block for the first carrier to the loading per physical resource block for the second carrier. Additionally or alternatively, the loading per control channel element, loading per slot, and/or loading per physical resource block may refer to actual and/or historical (e.g., based on historical, previously captured data) loading. In some aspects, the base station can examine and compare the loading per control channel element, loading per slot, loading per physical resource block, or any combination thereof, for the first and second carriers.

In various aspects, the estimated throughputs are determined by examining the total downlink bandwidth. For example, the base station may determine a total downlink bandwidth of the first carrier, determine a total downlink bandwidth of the second carrier, and compare the total downlink bandwidth of the first carrier to the total downlink bandwidth of the second carrier. In various aspects, the estimated throughputs are determined by examining the total quantity of layers. For example, the base station may determine a quantity of layers for the first carrier, determine a quantity of layers for the second carrier, and compare the quantity of layers for the first carrier to the quantity of layers for the second carrier. In various aspects, the estimated throughputs are determined by examining one or more of loading per control channel, loading per slot, loading per physical resource block, the total downlink bandwidth, the total quantity of layers, or any combination thereof.

Additionally or alternatively, the base station may determine the estimated throughputs of each carrier using a trained machine learning algorithm. For example, the trained machine learning algorithm can ingest, as input, one or more or a total bandwidth capacity and/or a radio frequency quality indicator for the first carrier, as well as one or more of a total bandwidth capacity and/or a radio frequency quality indicator for the second carrier. Examples of radio frequency quality indicators include RSRP values, RSRQ values, loading per control channel, loading per slot, loading per physical resource block, the total downlink bandwidth, the total quantity of layers, total traffic/traffic volume, network configurations, and/or any combination thereof. Then, in response to ingesting the data, the machine learning algorithm that is trained with historical carrier usage data for a plurality of user devices that includes a plurality of total bandwidth capacities and a plurality of radio frequency quality indicators can determine the first and second estimated throughputs for the first and second carrier, respectively.

At block 310, the first estimated throughput of the user device for the first carrier is compared to the second estimated throughput of the user deice on the second carrier. At block 312, when the first estimated throughput is less than the second estimated throughput, the base station causes the user device to disconnect from the first carrier and to connect to the second carrier. In other aspects, when the first estimated throughput is less than the second estimated throughput and/or the first estimated throughput is below a threshold, the base station causes the user device to disconnect from the first carrier and to connect to the second carrier. In yet another aspect, when the first estimated throughput is below a first-carrier-specific throughput threshold and meets or exceeds a second-carrier-specific throughput threshold, the base station causes the user device to disconnect from the first carrier and to connect to the second carrier. The threshold(s) can be a predetermined or predefined throughput value(s) and threshold(s) may be specific to each carrier or may be the same, in various aspects. As such, the base station can perform a handover of the user device from the first carrier to the second carrier in order to rebalance the carriers and increase or improve the throughput of the user device. At block 314, when the first estimated throughput is equal to or greater than the second estimated throughput, the base station causes the user device to maintain connection to the first carrier. In this scenario, a handover of the user device from the first carrier to the second carrier would not increase or improve the throughput of the user device, so the user device's connection via the first carrier is maintained.

Figure 4:
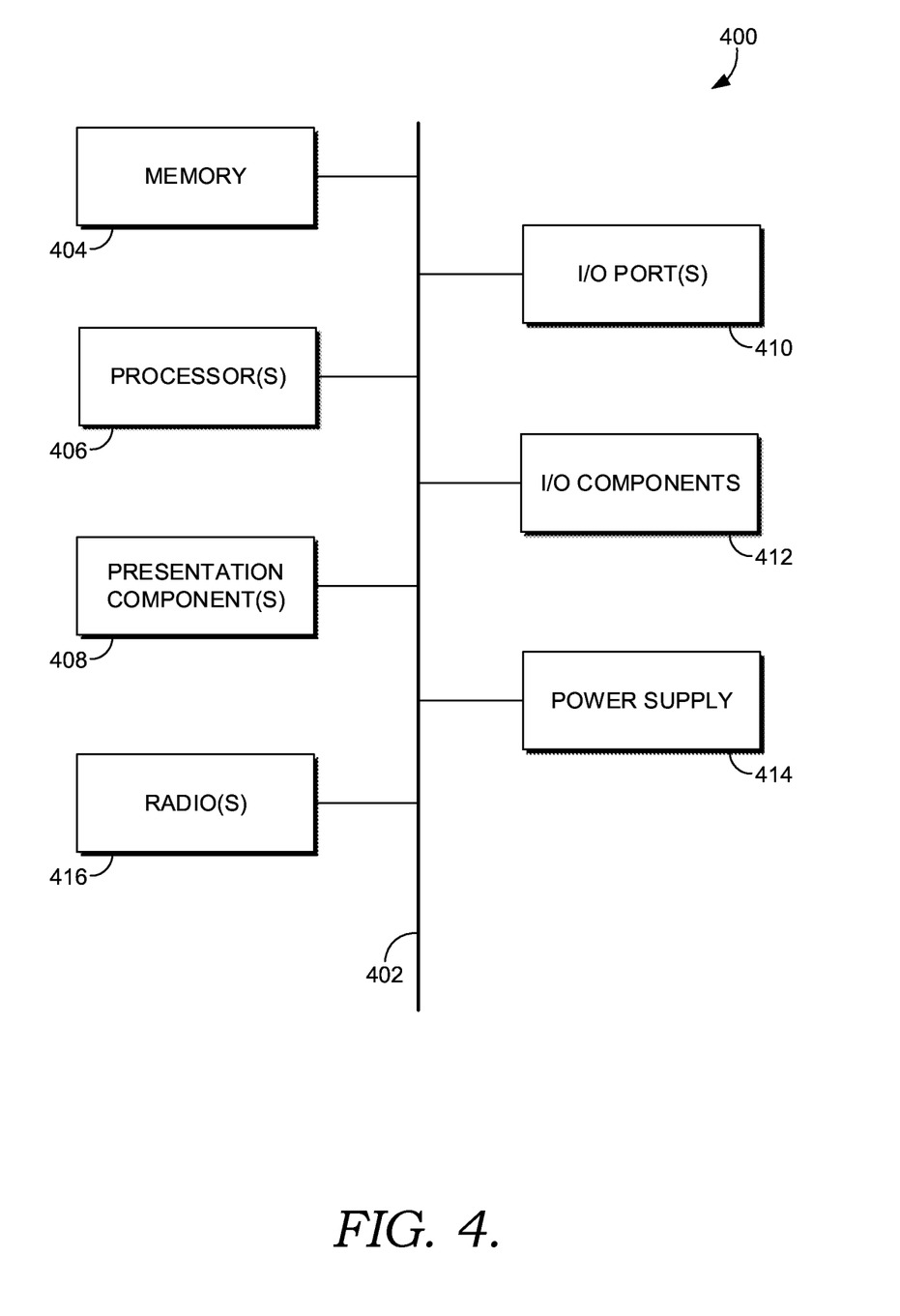
FIG. 4 illustrates an example computing device suitable for use in implementations of the present disclosure.

Turning now to FIG. 4, a diagram is depicted of an example computing device suitable for use in implementations of the present disclosure. Computing device 400 is but one example of a suitable computing environment and is not intended to suggest any limitation as to the scope of use or functionality of the invention, and nor should computing device 400 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, computing device 400 includes bus 402 that directly or indirectly couples the following devices: memory 404, one or more processors 406, one or more presentation components 408, input/output (I/O) ports 410, I/O components 412, and power supply 414. Bus 402 represents what may be one or more buses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of I/O components 412. Also, processors, such as one or more processors 406, have memory. Distinction is not made between such categories as "workstation," "server," "laptop," "handheld device," etc., as all are contemplated within the scope of FIG. 8 and refer to "computer" or "computing device."

Computing device 400 typically includes a variety of computer-readable media. Computer-readable media can be any available media that can be accessed by computing device 400 and includes both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, DVDs, or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or non-volatile memory. Memory 404 may be removable, non-removable, or a combination thereof. Examples of memory includes solid-state memory, hard drives, optical-disc drives, etc. Computing device 400 includes one or more processors 406 that read data from various entities such as bus 402, memory 404, or I/O components 412. One or more presentation components 408 presents data indications to a person or other device. Examples of one or more presentation components 408 include a display device, speaker, printing component, vibrating component, etc. I/O ports 410 allow computing device 400 to be logically coupled to other devices including I/O components 412, some of which may be built in computing device 400. Illustrative I/O components 412 include a microphone, joystick, game pad, satellite dish, scanner, printer, wireless device, etc.

Radio 416 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, or other VoIP communications. As can be appreciated, in various aspects, radio 416 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some aspects.

Many different arrangements of the various components depicted, as well as components not shown, are possible without departing from the scope of the claims below. Aspects of our technology have been described with the intent to be illustrative rather than restrictive. Alternative aspects will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method for component carrier load balancing in a carrier aggregation schema, the computerized method comprising:
receiving user device-specific data, the user device-specific data identifying one or more of a user device-specific capability or user device-specific measurements;
determining that the user device is connected to a first component carrier, wherein the first component carrier is a primary component carrier;
determining that a second component carrier is available for potential connection to the user device, wherein the second component carrier is a secondary component carrier;
based on the user device-specific data, determining a first estimated throughput of the user device for the first component carrier to which the user device is connected and a second estimated throughput of the user device on the second component carrier that is available for potential connection to the user device;
comparing the first estimate throughput and the second estimated throughput;
when the first estimated throughput is less than the second estimated throughput, causing the user device to disconnect from the first component carrier and to connect to the second component carrier; and
when the first estimated throughput is equal to or greater than the second estimated throughput, causing the user device to maintain connection to the first component carrier.

2. The method of claim 1, wherein determining, by the base station, the first estimated throughput of the user device for the first component carrier to which the user device is connected and the second estimated throughput of the user device on the second component carrier that is available for potential connection to the user device comprises:
determining loading per control channel element of the first component carrier;
determining loading per control channel element of the second carrier; and
comparing the loading per control channel element of the first component carrier to the loading per control channel element of the second component carrier.

3. The method of claim 1, wherein determining, by the base station, the first estimated throughput of the user device for the first component carrier to which the user device is connected and the second estimated throughput of the user device on the second component carrier that is available for potential connection to the user device comprises:
determining loading per slot of the first component carrier;
determining loading per slot of the second component carrier; and
comparing the loading per slot of the first component carrier to the loading per slot of the second component carrier.

4. The method of claim 1, wherein determining, by the base station, the first estimated throughput of the user device for the first component carrier to which the user device is connected and the second estimated throughput of the user device on the second component carrier that is available for potential connection to the user device comprises:
determining loading per physical resource block for the first component carrier;
determining loading per physical resource block for the second component carrier; and
comparing the loading per physical resource block for the first component carrier to the loading per physical resource block for the second component carrier.

5. The method of claim 1, wherein determining, by the base station, the first estimated throughput of the user device for the first component carrier to which the user device is connected and the second estimated throughput of the user device on the second component carrier that is available for potential connection to the user device comprises:
determining a total downlink bandwidth of the first component carrier;
determining a total downlink bandwidth of the second component carrier; and
comparing the total downlink bandwidth of the first component carrier to the total downlink bandwidth of the second component carrier.

6. The method of claim 1, wherein determining, by the base station, the first estimated throughput of the user device for the first component carrier to which the user device is connected and the second estimated throughput of the user device on the second component carrier that is available for potential connection to the user device comprises:
determining a quantity of layers for the first component carrier;
determining a quantity of layers for the second component carrier; and
comparing the quantity of layers for the first component carrier to the quantity of layers for the second component carrier.

7. The method of claim 1, wherein determining, by the base station, the first estimated throughput of the user device for the first component carrier to which the user device is connected and the second estimated throughput of the user device on the second component carrier that is available for potential connection to the user device comprises:
ingesting at least one of a total bandwidth capacity and a radio frequency quality indicator for the first component carrier and at least one of a total bandwidth capacity and a radio frequency quality indicator for the second component carrier; and
in response to ingesting, determining, by a machine learning algorithm that is trained with historical carrier usage data for a plurality of user devices that includes a plurality of total bandwidth capacities and a plurality of radio frequency quality indicators, the first and second estimated throughputs.

8. One or more non-transitory computer-readable media storing instructions that when executed via one or more processors performs a computerized method, the media comprising:
via one or more processors:
receiving user device-specific data, the user device-specific data identifying one or more of a user device-specific capability or user device-specific measurements;
determining, by a base station, that the user device is connected to a first component carrier, wherein the first component carrier is a primary component carrier;
determining, by the base station, that a second component carrier is available for potential connection to the user device, wherein the second component carrier is a secondary component carrier;

determining, by a base station using the user device-specific data, a first estimated throughput of the user device for the first component carrier to which the user device is connected and a second estimated throughput of the user device on the second component carrier that is available for potential connection to the user device;

comparing the first estimate throughput and the second estimated throughput;

when the first estimated throughput is less than the second estimated throughput and the first estimated throughput is less than a throughput threshold, causing the user device to disconnect from the first component carrier and to connect to the second component carrier; and when the first estimated throughput is equal to or greater than the second estimated throughput, causing the user device to maintain connection to the first component carrier.

9. The one or more non-transitory computer-readable media of claim 8 wherein determining, by the base station, the first estimated throughput of the user device for the first component carrier to which the user device is connected and the second estimated throughput of the user device on the second component carrier that is available for potential connection to the user device comprises:

determining loading per control channel element of the first component carrier;

determining loading per control channel element of the second component carrier; and comparing the loading per control channel element of the first component carrier to the loading per control channel element of the second component carrier.

10. The one or more non-transitory computer-readable media of claim 8 wherein determining, by the base station, the first estimated throughput of the user device for the first component carrier to which the user device is connected and the second estimated throughput of the user device on the second component carrier that is available for potential connection to the user device comprises:

determining loading per slot of the first component carrier;

determining loading per slot of the second component carrier; and comparing the loading per slot of the first component carrier to the loading per slot of the second component carrier.

11. The one or more non-transitory computer-readable media of claim 8 wherein determining, by the base station, the first estimated throughput of the user device for the first component carrier to which the user device is connected and the second estimated throughput of the user device on the second component carrier that is available for potential connection to the user device comprises:

determining loading per physical resource block for the first component carrier;

determining loading per physical resource block for the second component carrier; and comparing the loading per physical resource block for the first component carrier to the loading per physical resource block for the second component carrier.

12. The one or more non-transitory computer-readable media of claim 8 wherein determining, by the base station, the first estimated throughput of the user device for the first component carrier to which the user device is connected and the second estimated throughput of the user device on the second component carrier that is available for potential connection to the user device comprises:

determining a total downlink bandwidth of the first component carrier;

determining a total downlink bandwidth of the second component carrier; and comparing the total downlink bandwidth of the first component carrier to the total downlink bandwidth of the second component carrier.

13. The one or more non-transitory computer-readable media of claim 8 wherein determining, by the base station, the first estimated throughput of the user device for the first component carrier to which the user device is connected and the second estimated throughput of the user device on the second component carrier that is available for potential connection to the user device comprises:

determining a quantity of layers for the first component carrier;

determining a quantity of layers for the second component carrier; and comparing the quantity of layers for the first component carrier to the quantity of layers for the second component carrier.

14. The one or more non-transitory computer-readable media of claim 8 wherein determining, by the base station, the first estimated throughput of the user device for the first component carrier to which the user device is connected and the second estimated throughput of the user device on the second component carrier that is available for potential connection to the user device comprises:

ingesting at least one of a total bandwidth capacity and a radio frequency quality indicator for the first component carrier and at least one of a total bandwidth capacity and a radio frequency quality indicator for the second component carrier; and in response to ingesting, determining, by a machine learning algorithm that is trained with historical carrier usage data for a plurality of user devices that includes a plurality of total bandwidth capacities and a plurality of radio frequency quality indicators, the first and second estimated throughputs.

15. A system for component carrier load balancing in a carrier aggregation schema, the system comprising:

one or more processors communicatively coupled to a base station, the one or more processors that, via executable computer instructions, cause the base station to:

receive user device-specific data, the user device-specific data identifying one or more of a user device-specific capability or user device-specific measurements;

determine, by a base station, that the user device is connected to a first component carrier, wherein the first carrier is a primary component carrier;

determine, by the base station, that a second carrier is available for potential connection to the user device, wherein the second component carrier is a secondary component carrier;

determine, by a base station using the user device-specific data, a first estimated throughput of the user device for the first component carrier to which the user device is connected and a second estimated throughput of the user device on the second component carrier that is available for potential connection to the user device;

compare the first estimate throughput and the second estimated throughput;

when the first estimated throughput is less than the second estimated throughput and the first estimated throughput is less than a throughput threshold, cause the user device to disconnect from the first component carrier and to connect to the second component carrier; and when the first estimated throughput is equal to or greater than the second estimated throughput, cause the user device to maintain connection to the first component carrier.

16. The system of claim 15, wherein the one or more processors cause the base station to further:

determine loading per control channel element of the first component carrier;

determine loading per control channel element of the second component carrier; and compare the loading per control channel element of the first component carrier to the loading per control channel element of the second component carrier.

17. The system of claim 15, wherein the one or more processors cause the base station to further:

determine loading per slot of the first component carrier;

determine loading per slot of the second component carrier; and compare the loading per slot of the first component carrier to the loading per slot of the second component carrier.

18. The system of claim 15, wherein the one or more processors cause the base station to further:

determine loading per physical resource block for the first component carrier;

determine loading per physical resource block for the second component carrier; and compare the loading per physical resource block for the first component carrier to the loading per physical resource block for the second component carrier.

19. The system of claim 15, wherein the one or more processors cause the base station to further:

determine a total downlink bandwidth of the first component carrier;

determine a total downlink bandwidth of the second component carrier; and compare the total downlink bandwidth of the first component carrier to the total downlink bandwidth of the second component carrier.

20. The system of claim 15, wherein the one or more processors cause the base station to further:

ingest at least one of a total bandwidth capacity and a radio frequency quality indicator for the first component carrier and at least one of a total bandwidth capacity and a radio frequency quality indicator for the second component carrier; and in response to ingesting, determine, by a machine learning algorithm that is trained with historical carrier usage data for a plurality of user devices that includes a plurality of total bandwidth capacities and a plurality of radio frequency quality indicators, the first and second estimated throughputs.

* * * * *